United States Patent
Ueno et al.

(10) Patent No.: US 11,890,687 B2
(45) Date of Patent: Feb. 6, 2024

(54) MILLING TOOL AND WORKPIECE MACHINING METHOD

(71) Applicant: MAKINO MILLING MACHINE CO., LTD., Tokyo (JP)

(72) Inventors: Hiroshi Ueno, Fujiyoshida (JP);
Ryoichi Miyamoto, Fujiyoshida (JP);
Fukuhito Nagata, Fujiyoshida (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 17/898,273

(22) Filed: Aug. 29, 2022

(65) Prior Publication Data

US 2022/0410291 A1 Dec. 29, 2022

Related U.S. Application Data

(62) Division of application No. 16/771,990, filed as application No. PCT/JP2017/044791 on Dec. 13, 2017.

(51) Int. Cl.
*B23C 3/00* (2006.01)
*B23C 5/10* (2006.01)

(52) U.S. Cl.
CPC .............. *B23C 5/1081* (2013.01); *B23C 3/00* (2013.01); *B23C 2220/04* (2013.01); *B23C 2265/08* (2013.01)

(58) Field of Classification Search
CPC ... B23C 5/1081; B23C 5/1063; B23C 5/1072; B23C 5/109; B23C 3/126; B23C 3/28;
(Continued)

(56) References Cited

U.S. PATENT DOCUMENTS 1,499,818 A * 7/1924 August ................. B23C 5/12
29/10
3,597,817 A 8/1971 Whalley
(Continued)

FOREIGN PATENT DOCUMENTS

CN 102091817 A 6/2011
CN 206296513 U 7/2017
(Continued)

OTHER PUBLICATIONS

International Search Report and Written Opinion dated Jan. 23, 2018, directed to International Application No. PCT/JP2017/044791, 15 pages.
(Continued)

*Primary Examiner* — Ryan Rufo
(74) *Attorney, Agent, or Firm* — Morrison & Foerster LLP

(57) ABSTRACT

A milling tool is configured from a shank part and a head with a cutting edge that is provided on the leading end of the shank part. The head comprises an expanding diameter section, the diameter of which expands gradually from the base end that contacts the shank part in the direction of the leading end, and a decreasing diameter section, the diameter of which gradually decreases from the maximum diameter section in the direction of the leading end. At least one cutting edge is provided on each of the expanding diameter section and the decreasing diameter section.

3 Claims, 22 Drawing Sheets

(58) Field of Classification Search
CPC . B23C 3/30; B23C 2210/242; B23C 2220/16; B23C 2220/20; B23C 2220/36; B23C 2265/08; B23C 2220/48; B23C 2220/04; B23C 5/1054; B23C 3/10; B23C 2210/248; B23F 21/18; B23F 21/183; B23F 21/186; B23F 21/163; B23F 21/166; E01B 31/13; B23G 5/18; B23G 5/182; B23G 5/186
See application file for complete search history.

(56) References Cited

U.S. PATENT DOCUMENTS

| | | | |
|---|---|---|---|
| 3,922,766 | A | 12/1975 | Malinchak |
| 4,699,549 | A * | 10/1987 | Shimomura .......... B23C 5/1072 407/62 |
| 4,844,670 | A | 7/1989 | Heule |
| 4,946,321 | A * | 8/1990 | Allemann ................. B23C 5/28 409/132 |
| 4,960,352 | A | 10/1990 | Kishi |
| 5,913,643 | A | 6/1999 | Fowler et al. |
| 5,931,616 | A | 8/1999 | Daub |
| 6,149,354 | A * | 11/2000 | Walters ..................... B23C 5/10 407/57 |
| 6,976,810 | B2 * | 12/2005 | Helvey ................. B23C 5/1054 407/56 |
| 7,390,152 | B2 * | 6/2008 | Harif ...................... B23Q 5/045 409/230 |
| 8,267,625 | B2 | 9/2012 | Hughes |
| 8,708,609 | B2 | 4/2014 | Sagstrom et al. |
| 8,834,076 | B2 | 9/2014 | Gesell et al. |
| 9,289,835 | B2 | 3/2016 | Shinjo et al. |
| 9,481,042 | B2 | 11/2016 | Haertel et al. |
| 9,776,257 | B2 * | 10/2017 | Ueno ....................... B23C 3/00 |
| 9,796,032 | B2 | 10/2017 | Bhagath et al. |
| 10,058,943 | B2 | 8/2018 | Thornqvist |
| 10,076,794 | B2 | 9/2018 | Koifman et al. |
| 10,384,276 | B2 | 8/2019 | Osawa et al. |
| 10,507,535 | B2 * | 12/2019 | Kobayashi ............. B23C 5/109 |
| 11,351,618 | B2 * | 6/2022 | Brambs ................. B23C 5/1009 |
| 2007/0122245 | A1 | 5/2007 | Yanagimoto |
| 2011/0027025 | A1 | 2/2011 | Horiike et al. |
| 2012/0282022 | A1 * | 11/2012 | Phebus ..................... F16D 1/10 403/359.1 |
| 2012/0282043 | A1 | 11/2012 | Tang et al. |
| 2013/0177362 | A1 * | 7/2013 | Cigni ........................ B23C 3/00 407/53 |
| 2013/0220485 | A1 | 8/2013 | Larsson et al. |
| 2015/0298225 | A1 | 10/2015 | Ueno et al. |
| 2015/0375311 | A1 | 12/2015 | Horiguchi |
| 2016/0107247 | A1 | 4/2016 | Li et al. |
| 2017/0089202 | A1 * | 3/2017 | Wilber ..................... B23C 3/02 |

FOREIGN PATENT DOCUMENTS

| | | | | |
|---|---|---|---|---|
| CN | 206882872 U | | 1/2018 | |
| DE | 877091 C | | 5/1953 | |
| DE | 2426575 A1 | | 12/1975 | |
| DE | 102005019921 A1 | | 3/2006 | |
| DE | 102008056682 A1 | | 3/2010 | |
| EP | 0849021 A1 | | 6/1998 | |
| EP | 3031557 A1 | | 6/2016 | |
| FR | 1266945 A | | 7/1961 | |
| FR | 2967086 A1 | * | 5/2012 | ............. B23B 35/00 |
| GB | 1299577 A | | 12/1972 | |
| JP | S60-20815 A | | 2/1985 | |
| JP | S63-256306 A | | 10/1988 | |
| JP | 04300107 A | * | 10/1992 | |
| JP | H9-123009 A | | 5/1997 | |
| JP | H11-320232 A | | 11/1999 | |
| JP | 3180327 B2 | | 6/2001 | |
| JP | 2013-184285 A | | 9/2013 | |
| JP | 2015-16541 A | | 1/2015 | |
| KR | 10-0896119 B1 | | 5/2009 | |
| KR | 20140001305 U | * | 3/2014 | |
| WO | WO-02057040 A1 | * | 7/2002 | ........... B23C 5/1072 |
| WO | 2006/018894 A1 | | 2/2006 | |
| WO | 2014/068710 A1 | | 5/2014 | |
| WO | 2015/015668 A1 | | 2/2015 | |

OTHER PUBLICATIONS

Ueno et al., U.S. Office Action dated Aug. 4, 2022, directed to U.S. Appl. No. 16/771,990; 10 pages.

Drozda et al. (1983) "Milling Cutters" Chapter 10 in Tool and Manufacturing Engineers Handbook, Society of Manufacturing Engineers, 4th Edition, vol. 1; 6 pages.

Ueno et al., U.S. Office Action dated Jan. 31, 2023, directed to U.S. Appl. No. 16/771,990; 11 pages.

Ueno et al., U.S. Office Action dated Jun. 14, 2023, directed to U.S. Appl. No. 16/771,990; 13 pages.

* cited by examiner

MILLING TOOL AND WORKPIECE MACHINING METHOD

CROSS-REFERENCE TO RELATED APPLICATIONS

This application is a divisional of U.S. application Ser. No. 16/771,990, filed Jun. 11, 2020, which is a U.S. national stage application under 35 USC 371 of International Patent Application No. PCT/JP2017/044791, filed Dec. 13, 2017, the entire contents of each priority application is incorporated herein by reference.

FIELD OF THE DISCLOSURE

The present invention relates to a milling tool and workpiece machining method which are capable of machining an undercut part such as a rib having a return flange with high efficiency and high accuracy.

BACKGROUND OF THE DISCLOSURE

Patent Literature 1 describes a T-shaped cutter for forming an undercut in a side surface of a workpiece. The T-shaped cutter has a head which is connected to one end of a shank, wherein a plurality of bottom blades having cutting edges on a distal end side of the head and a plurality of upper blades having cutting edges on a base edge side are alternately arranged in the peripheral direction, and the cutting edges of the bottom blades and the upper blades are integrally formed with the shank and the head.

PATENT LITERATURE

PTL 1 WO 2014068710

BRIEF SUMMARY OF THE DISCLOSURE

Since the bottom blades, upper blades, shank, and head of the T-shaped cutter of Patent Literature 1 are integrally formed, undercut machining can be performed with high rigidity and high efficiency. However, when the rib height becomes greater, the shank must be lengthened accordingly, and a large lateral force (bending stress) acts on the shank, causing deformation of the shank, whereby there is a problem in that machining speed and machining accuracy are reduced. Furthermore, in the T-shaped cutter of Patent Literature 1, there is a problem in that only an inner peripheral surface having a radius of curvature greater than or equal to the radius of the head of the T-shaped cutter can be machined when the curved inner peripheral surface at the corner where the ribs of the workpiece intersect is machined.

The present invention aims to solve such problems of the prior art and aims to provide a milling tool and workpiece machining method which are capable of machining an undercut part such as a rib having a return flange with high efficiency and high accuracy.

In order to achieve the above object, according to the present invention, there is provided a milling tool composed of a shank part, and a head which is provided on a distal end of the shank part and which has a cutting edge, wherein the head has an expanding diameter section, the diameter of which gradually increases along a direction from a proximal end contiguous with the shank part toward a distal end, and a decreasing diameter section, the diameter of which gradually decreases along a direction from a maximum diameter section toward the distal end, and cutting edges are provided on the expanding diameter section and the decreasing diameter section.

Furthermore, according to the present invention, there is provided a workpiece machining method for undercutting interior portions of a rib of a workpiece attached to a table of a machine tool and a return flange formed contiguous with the rib, the method comprising the steps of attaching the milling tool according to claim 1 to a spindle of the machine tool and rotating the milling tool, and machining an interior of the return flange with a cutting edge of the expanding diameter section of the milling tool and machining a side surface of the rib with a cutting edge of the decreasing diameter section of the milling tool.

According to the present invention, since the head of the milling tool has an expanding diameter section, the diameter of which gradually increases along the direction from a proximal end toward the distal end, and a decreasing diameter section, the diameter of which gradually decreases along the direction from a maximum diameter section toward the distal end, and cutting edges are provided on the expanding diameter section and the decreasing diameter section, the milling tool can diagonally approach the undercut part of the workpiece and machining of the workpiece can be performed without interference with the return flange, whereby the protruding length of the shank can be shortened. The undercut part can be machined efficiently and with high quality under high machine conditions.

DETAILED DESCRIPTION OF THE DISCLOSURE

Figure 1:
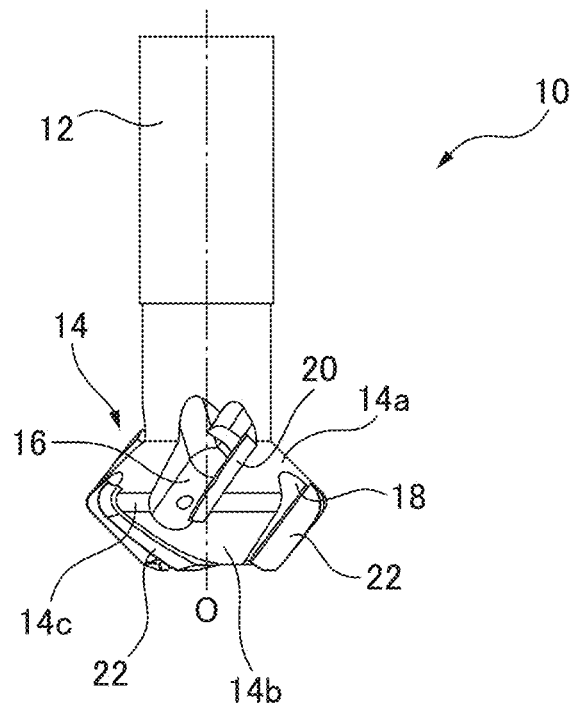
FIG. 1 is a front view of a milling tool according to a first example of the present invention.
Figure 2:
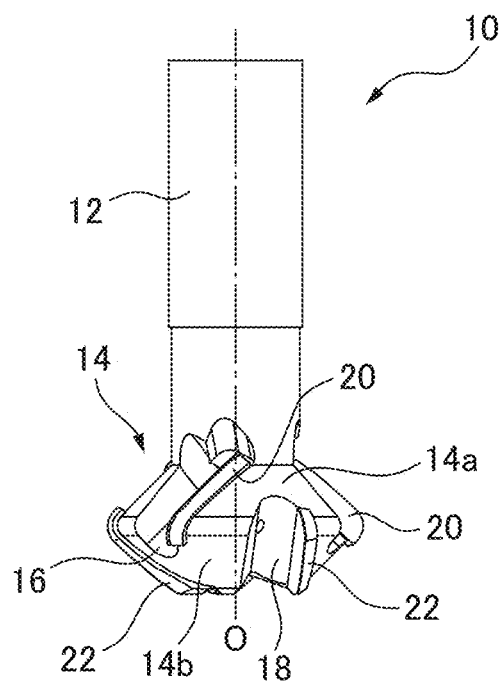
FIG. 2 is a side view of the milling tool viewed from a direction differing by 90° from FIG. 1.
Figure 3:
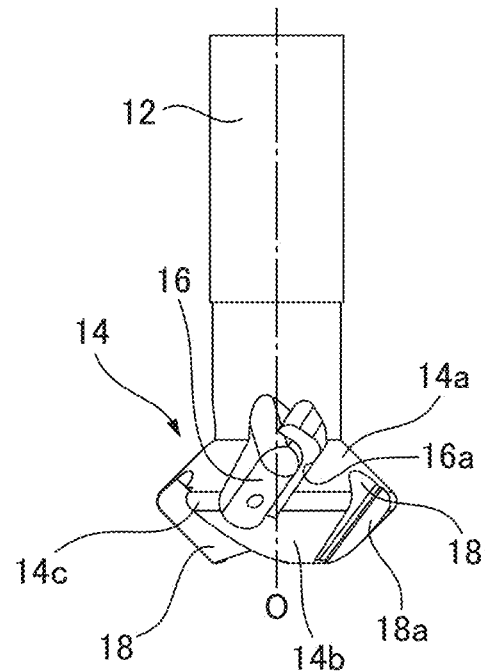
FIG. 3 is a front view of the milling tool of FIG. 1 in which the cutting edge is removed.
Figure 4:
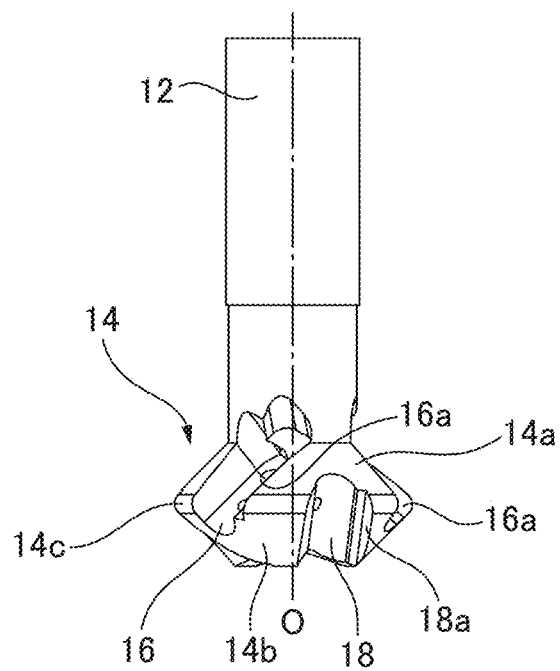
FIG. 4 is a side view of the milling tool of FIG. 2 in which the cutting edge is removed.
Figure 5:
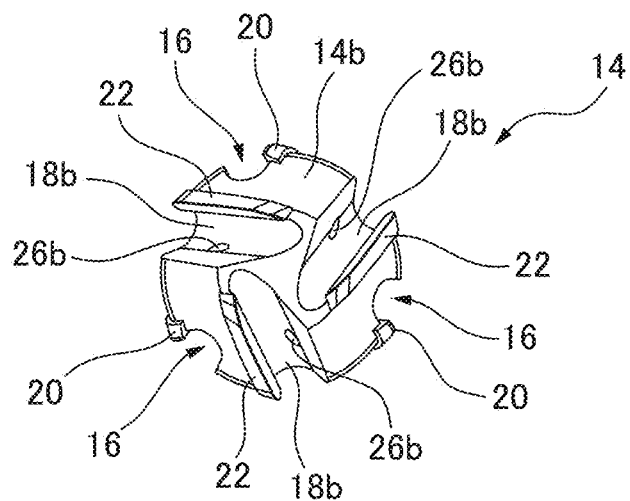
FIG. 5 is a bottom view of the milling tool of FIG. 1 view from the head side.
Figure 6:
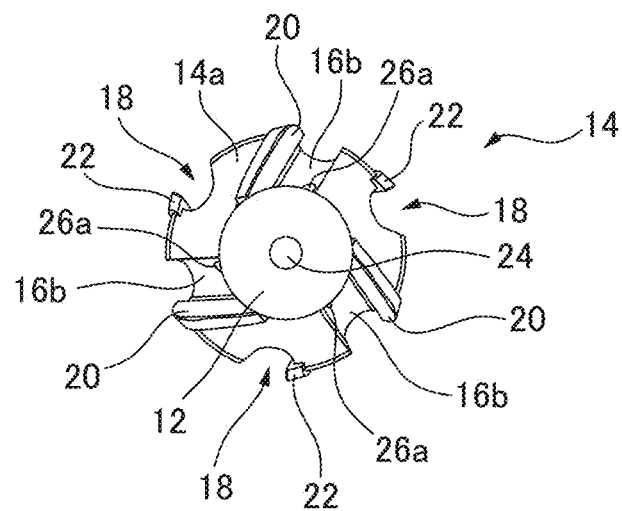
FIG. 6 is a plan view of the milling too of FIG. 1 viewed from the shank side.

Preferred examples of the present invention will be described below with reference to the attached drawings.

First, referring to FIGS. 1 to 12, a first example of the milling tool of the present invention will be described.

A milling tool 10 comprises a cylindrical shank 12 and a head 14 which is integrally formed with the tip of the shank 12. The head 14 has an approximately frustoconical expanding diameter section 14a, the diameter of which increases along the direction from the proximal end which contacts the shank 12 toward the distal end, and an approximately frustoconical decreasing diameter section 14b, the diameter of which decreases along the direction from the expanding diameter section 14a toward the distal end, and the head is formed into substantially a double conical shape. A transition part 14c as a maximum diameter part, at which the diameter is maximum, is formed between the expanding diameter section 14a and the decreasing diameter section 14b. The head 14 has upper grooves 16 formed in the expanding diameter section 14a and lower grooves 18 formed in the decreasing diameter section 14b. The upper grooves 16 and lower grooves 18 are alternatingly arranged at equal angular intervals about the central axis O of the head 14. In the illustrated example, the head 14 has three upper grooves 16 and three lower grooves 18. Note that though the upper grooves 16 and the lower grooves 18 are arranged at equal angular intervals in the present example, they may be irregular angular intervals in order to prevent chatter.

An upper seat 16a is formed in each upper groove 16, and a lower seat (FIGS. 3 and 4) is formed in each lower groove 18. An upper insert 20 is attached to each upper seat 16a, and a lower insert 22 is attached to each lower seat 18a. Though three upper inserts 20 are arranged in the expanding diameter section 14a and three lower inserts 22 are arranged in the decreasing diameter section 14b in the illustrated example, the number of upper inserts 20 and lower inserts 22 is not limited to three in the present invention, and at least one upper insert 20 and at least one lower insert 22 may be arranged. Thus, the expanding diameter section 14a and the decreasing diameter section 14b may comprise at least one upper groove 16 and at least one lower groove 18, respectively.

The upper seat 16a is formed such that a linear main cutting edge 20c (FIGS. 7 to 9) of the upper insert 20 attached to the upper seat 16a obliquely extends in a direction in which the main cutting edge gradually approaches the transition part 14c in the direction of the rotation of the milling tool 10. The lower seat 18a is formed such that a linear main cutting edge 22c (FIGS. 10 to 12) of the lower insert 22 attached to the lower seat 18a obliquely extends in a direction in which the main cutting edge gradually approaches the transition part 14c in the direction of rotation of the milling tool 10.

Further, a coolant passage for providing coolant to the machining area can be formed in the milling tool 10. The coolant passage can include an inlet passage 24 which passes through the shank 12 along the central axis O of the milling tool 10, an upper radial passage 26a which passes through the head 14 from the inlet passage 24 in the radial direction and which opens into a side wall 16b which faces the upper seat 16a of each upper groove 16, and a lower radial passage 26b which opens into a side wall 18b which faces the lower seat 18a of each lower groove 18.

Figure 7:
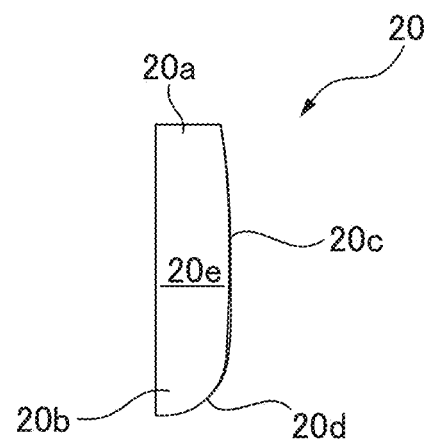
FIG. 7 is a front view of an upper insert used in the milling tool of FIG. 1.
Figure 8:
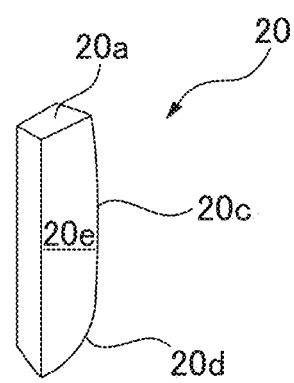
FIG. 8 is a perspective view of the upper insert of FIG. 7.
Figure 9:
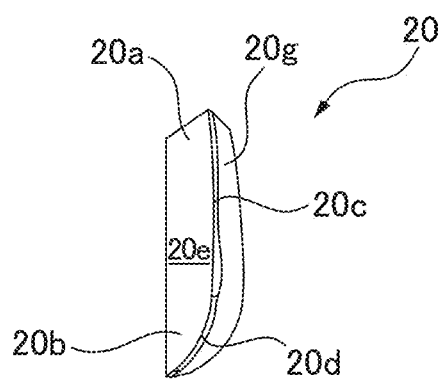
FIG. 9 is a perspective view of the upper insert of FIG. 7 as viewed from a different direction.

Referring to FIGS. 7 to 9, the upper insert 20 has an upper edge 20a and a lower edge 20b. The upper insert 20 is attached to the upper seat 16a so that the lower edge 20b is arranged near the transition part 14c. The upper insert 20, when attached to the upper seat 16a, has a rake face 20e which is arranged on the side opposite the upper seat 16a and which faces the side wall 16b of the upper groove 16 and a flank face 20g which is oriented toward the radially outer side. A main cutting edge 20c which extends substantially linearly from the upper edge 20a and an arc-shaped sub cutting edge 20d which is provided adjacent the lower edge 20b and which is connected to the main cutting edge 20c are formed by the rake face 20e and the flank face 20g.

Figure 10:
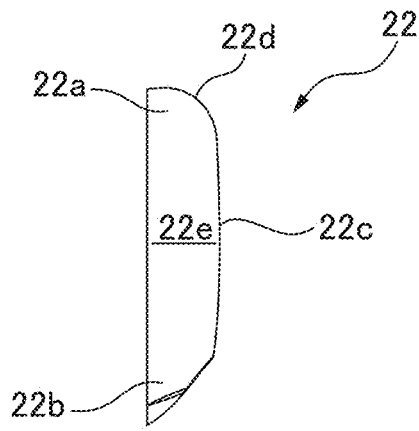
FIG. 10 is a front view of a lower insert used in the milling tool of FIG. 1.
Figure 11:
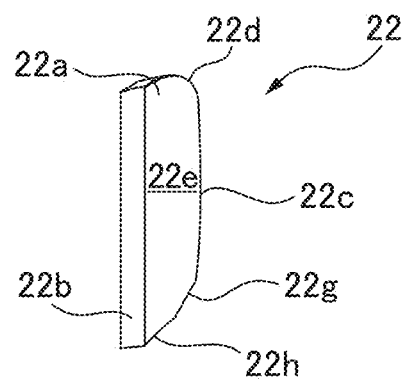
FIG. 11 is a perspective view of the lower insert of FIG. 10.
Figure 12:
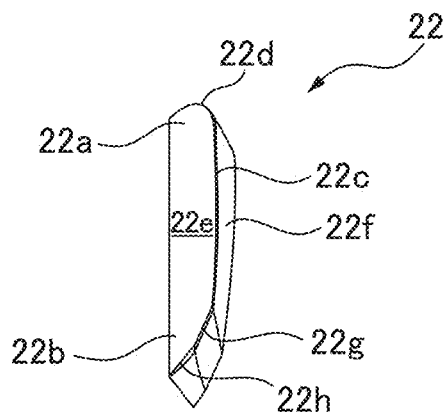
FIG. 12 is a perspective view of the lower insert of FIG. 10 as viewed from a different direction.

Referring to FIGS. 10 to 12, the lower insert 22 has an upper edge 22a and a lower edge 22b. The lower insert 22 is attached to the lower seat 18a so that the upper edge 22a is arranged near the transition part 14c. The lower insert 22, when attached to the lower seat 18a, has a rake face 22e which is arranged on the side opposite the lower seat 18a and which faces the side wall 18b of the lower groove 18, and a flank face 20f which is oriented toward the radially outer side. A main cutting edge 22c which extends substantially linearly from the lower edge 22b and an arc-shaped sub cutting edge 22d which is provided adjacent the upper edge 22a and which is connected to the main cutting edge 22c are formed by the rake face 22e and the flank face 22f. A bottom cutting edge 22g which is connected to the main cutting edge 22c and an inner cutting edge 22h which is connected to the bottom cutting edge 22g are formed on the lower edge 22b of the lower insert 22.

The upper insert 20 and the lower insert 22 are attached to the upper seat 16a and the lower seat 18a, respectively, so that the respective sub cutting edges 20d, 22d are arranged in a forward twisted manner with respect to the main cutting edges 20c, 22c in the direction of rotation of the milling tool 10. Specifically, the upper insert 20 and the lower insert 22 are attached while being alternatingly inclined. Further, the upper inserts 20 are attached to the upper seats 16a so that all of the main cutting edges 20c of the upper inserts 20 rotate along a single conical surface when the milling tool 10 rotates about the central axis O. Likewise, the lower inserts 22 are attached to the lower seats 18a so that all of the main cutting edges 22c of the lower inserts 22 rotate along a single conical surface when the milling tool 10 rotates about the central axis O. Note that the sub cutting edges 20d, 22d are arranged in a rearward twisted manner with respect to the main cutting edges 20c, 22c in the direction of rotation of the milling tool 10, or may be arranged in a non-twisted state.

Though the two conical surfaces drawn by the main cutting edges 20c, 22c of the upper insert 20 and the lower insert 20 when the milling tool 10 rotates are symmetrical with respect to the plane defined by the line of intersection between the two conical surfaces in the illustrated example, they may be asymmetrical depending on the target machining process or workpiece shape. Furthermore, the lines of intersection (the generatrix of each conical surface) between the plane including the central axis O and the two conical surfaces described above intersect at a predetermined angle. This angle can be set to various values in accordance with the target machining process. The angle that the two lines of intersection form can be equal to, for example, the angle between the rib, which is described later, and the return flange protruding from the upper end of the rib, and can be preferably 90°. Furthermore, the main cutting edge 20c of the upper insert 20 is formed so as to be longer than the protruding dimension (width) of the return flange.

Further, the upper insert 20 and the lower insert 22 are attached to the upper seat 16a and the lower seat 18a, respectively, so that the sub cutting edges 20d, 22d move, when the milling tool 10 rotates about the central axis O, along the shape of the rotating body, which is the locus when one circular arc that bulges in the radial direction of the head 14 rotates about the central axis O of the milling tool 10. The shape of the rotating body may be a shape which is inscribed in both of the two conical surfaces drawn by the main cutting edges 20c, 22c of the upper insert 20 and the lower insert 22 when the milling tool 10 rotates.

Furthermore, the shank 12 and head 14 may be integrally formed using tool steel, and the upper insert 20 and the lower insert 22 can be attached to the upper seat 16a and the lower seat 18a of the head 14 using an appropriate bonding technology such as brazing. Further, after the upper insert 20 and lower insert 22 have been attached to the upper seat 16a and the lower seat 18a, the upper insert 20 and the lower insert 22 may be ground so that the generatrix of each of the two conical surfaces drawn by the main cutting edges 20c, 22c achieves an angle matching the angle between the rib of the workpiece and the return flange protruding from the upper end of the rib and the shape of the rotating body drawn by the sub cutting edges 20d, 22d is inscribed on both of the two conical surfaces.

A rib machining method using the milling tool 10 will be described below with reference to FIGS. 13A to 15B. In FIGS. 13A to 15B, a product 100, which is a workpiece, has a bottom wall 102, a rib 104 formed in a thin wall extending perpendicularly from the bottom wall 102, and first and second return flanges 106, 108 which protrude in opposite directions from the upper end of the rib 104 substantially in parallel to the bottom wall 102. In the examples of FIGS. 13A to 15B, on a machine tool (not illustrated) such as a four-axis machining center having at least three orthogonal linear feed axes and at least one rotary feed shat, and preferably a five-axis machining center having three orthogonal linear feed axes and two rotary feed axes, an end mill 70, the milling tool 10 according to the present example, and a T-shaped cutter 72 are sequentially attached to the tip of a spindle 80 of the machine tool, and the product 100 is cut out from a thick plate made of a metal material such as an aluminum alloy. Note that each of the end mill 70, the milling tool 10, and the T-shaped cutter 72 are attached to the spindle 80 via a tool holder 74. Furthermore, the workpiece is affixed to a table (not illustrated) of the machine tool.

Figure 13A:
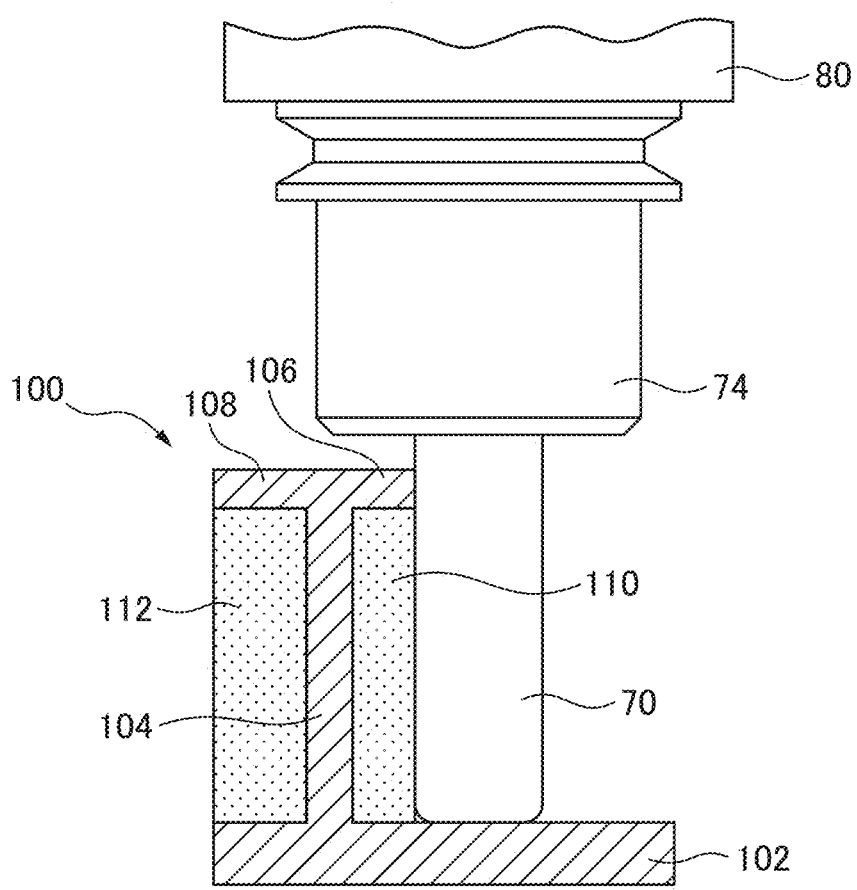
FIG. 13A is a schematic view detailing a method for machining a rib having a return flange.
Figure 13B:
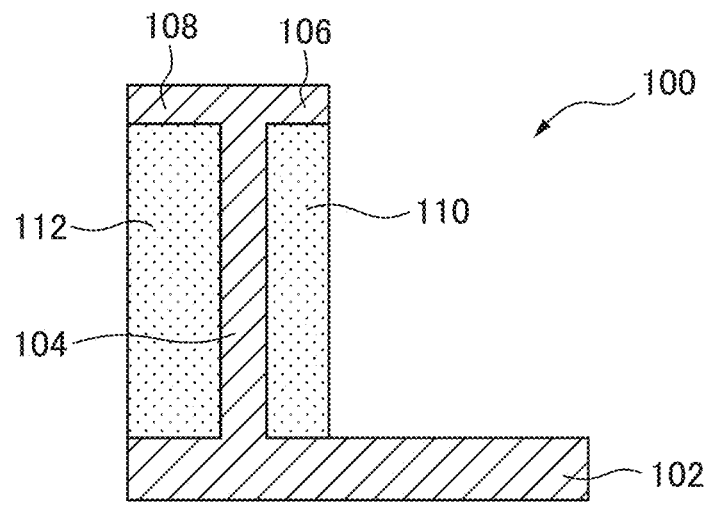
FIG. 13B is a schematic view detailing a method for machining a rib having a return flange.

Machining is performed from one of the first and second return flanges 106, 108, and in the present example, from the first return flange 106 side. First, in accordance with the width dimension of the first return flange 106, material is removed from the thick plate (FIG. 13B) in areas other than the bottom wall 102, the first and second return flanges 106, 108, and portions 110, 112 between the first and second return flanges 106, 108 and the bottom wall 102 using a rotary tool which is capable of cutting with the side surface of the tool, such as the end mill 70 (FIG. 13A).

Figure 14A:
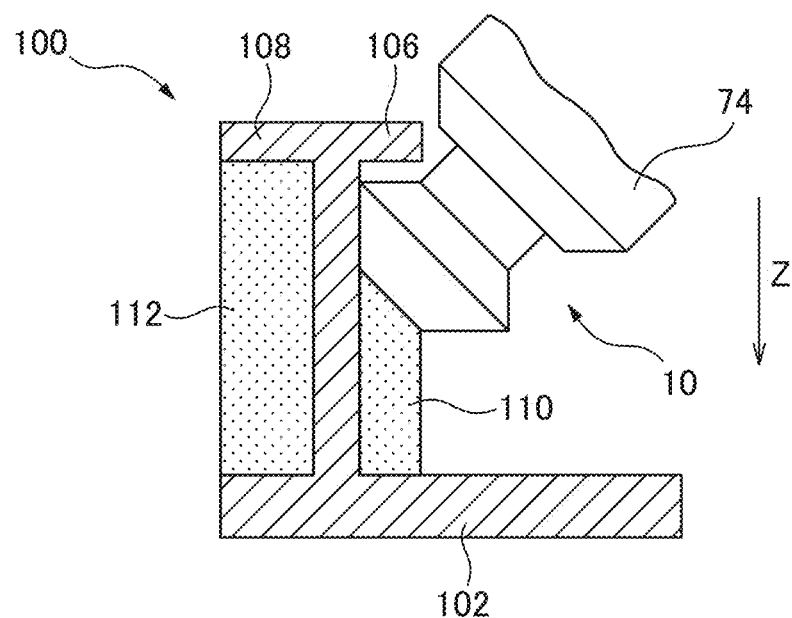
FIG. 14A is a schematic view detailing a method for machining a rib having a return flange.
Figure 14B:
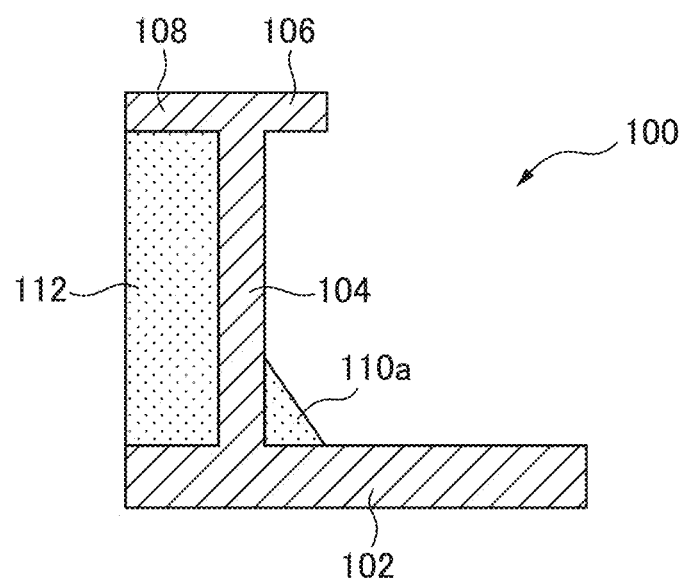
FIG. 14B is a schematic view detailing a method for machining a rib having a return flange.
Figure 15A:
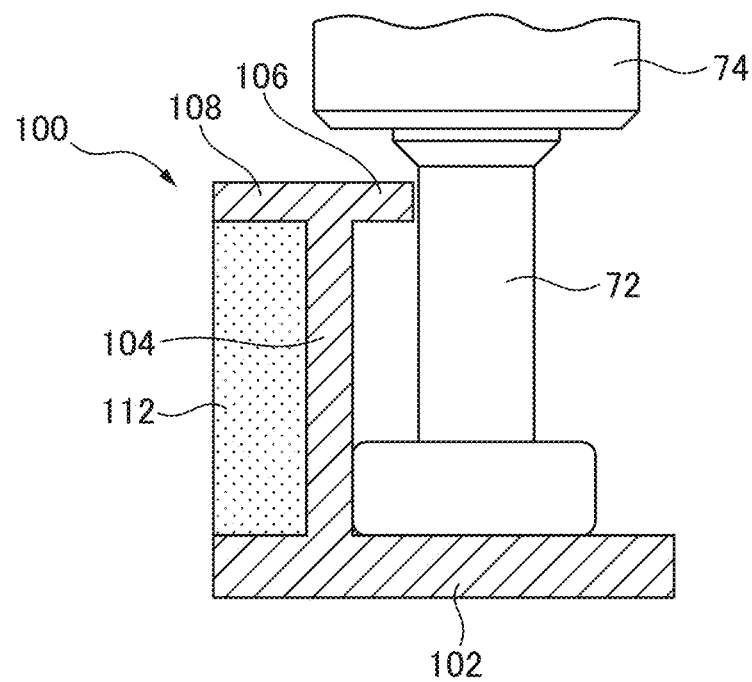
FIG. 15A is a schematic view detailing a method for machining a rib having a return flange.
Figure 15B:
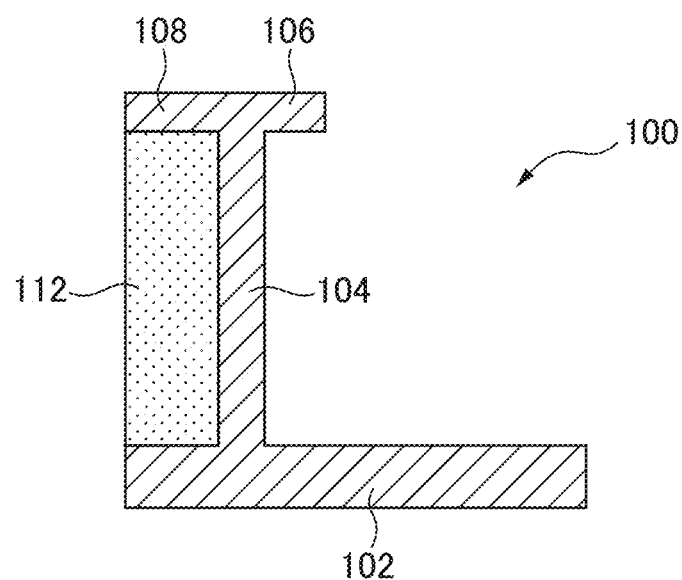
FIG. 15B is a schematic view detailing a method for machining a rib having a return flange.

Next, the end mill 70 is exchanged with the milling tool 10 (FIG. 14A), and material is removed (undercut) from portion 110 between the first return flange 106 and the bottom wall 102. At this time, as shown in FIG. 14A, the rotary feed axis of the machine tool is set so that the side surface of the rib 104 can be machined by the lower inserts 22. In FIG. 14A, the milling tool 10 is fed in the direction perpendicular to the sheet of the drawing with respect to the workpiece, is fed by only a predetermined distance (pick feed pitch) in the direction from the return flange 106 to the bottom wall 102, as illustrated by arrow Z, and is fed again in the direction perpendicular to the sheet of the drawing, and material of the portion 110 is sequentially removed from the first return flange 106 side to the bottom wall 102 side in strips having a width corresponding to the pick feed pitch. Until the lower insert 22 comes into contact with the surface of the bottom wall 102, when material is removed from portion 110 by feeding the milling tool 10 in the direction perpendicular to the surface of the drawing while repeating the pick feed in the direction indicated by arrow Z, finally, as shown in FIG. 14B, a triangular columnar portion 110a extending in the direction perpendicular to the surface of the drawing remains between the rib 104 and the bottom wall 102. Portion 110a can be removed (FIG. 15B) using the T-shaped cutter 72 (FIG. 15A). While undercutting is performed by the milling tool 10, not only the main cutting edges 20c, 22c and the sub cutting edges 20d, 22d but also the bottom cutting edge 22g and the inner cutting edge 22h contribute to the machine process, whereby machining can be performed without the occurrence of gouging.

Portion 112 between the second return flange 108 and the bottom wall 102 can be removed by the same method as the method described above. In this manner, the product 100 having the bottom wall 102, the rib 104 extending perpendicularly from the bottom wall 102, and the first and second return flanges 106, 108 which protrude parallel to each other in opposite directions from the upper end of the rib 104 toward the bottom wall 102 can be cut out from a metal thick plate material such as an aluminum alloy. The product 100 can be, for example, an aircraft wing part.

Figure 16:
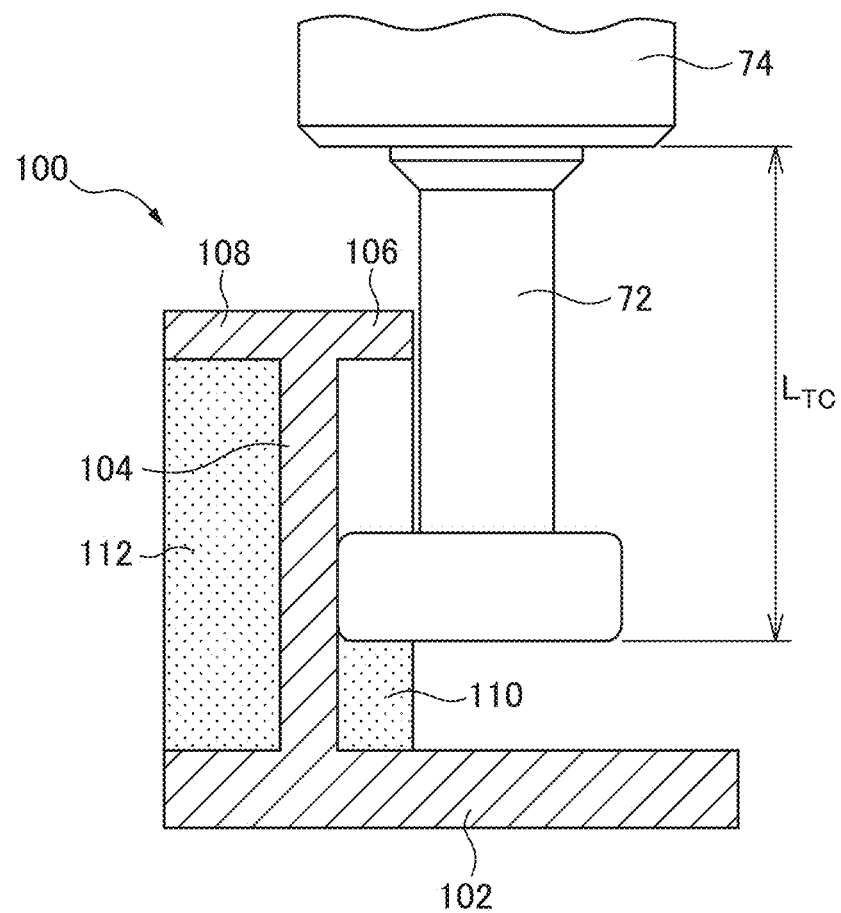
FIG. 16 is a schematic view detailing the machining of an undercut part when a T-shaped cutter is used.
Figure 17:
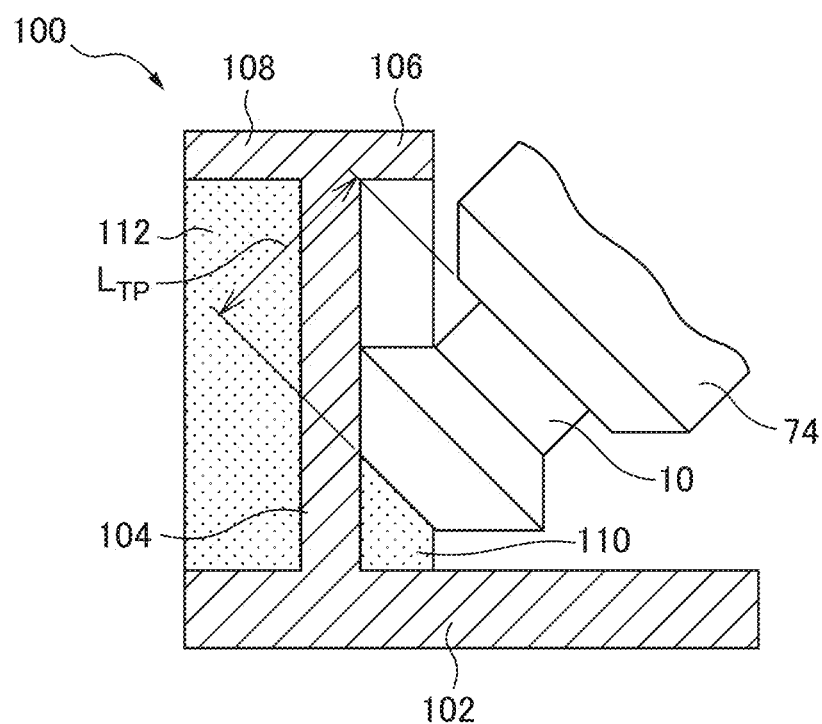
FIG. 17 is a schematic view detailing the machining of an undercut part when the milling tool of the present invention is used.
Figure 18:
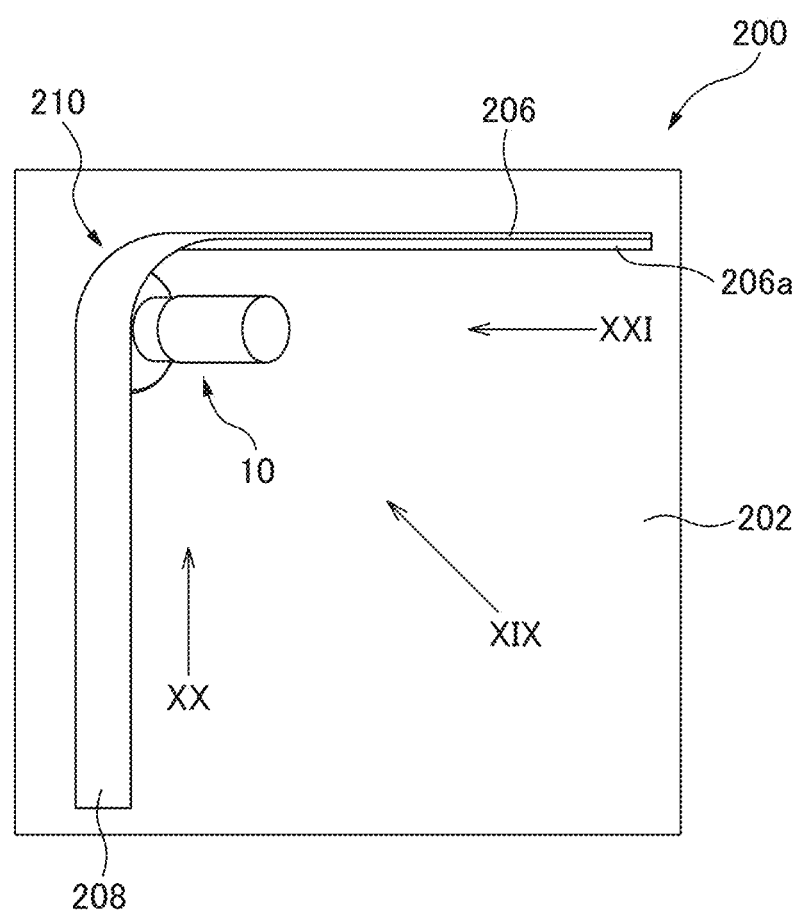
FIG. 18 is a schematic view detailing the machining of an undercut part at a corner part, and in FIG. 18, the milling tool reaches the inlet of the corner part.
Figure 19:
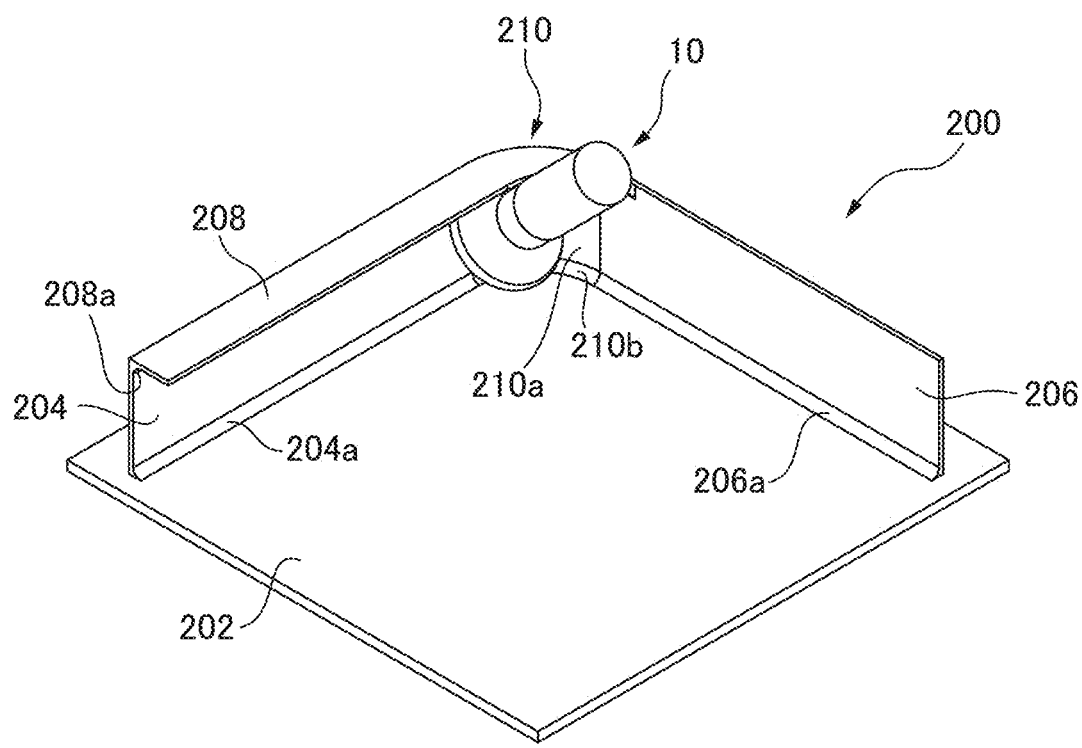
FIG. 19 is a perspective view as viewed in the direction of arrow XIX of FIG. 18.
Figure 20:
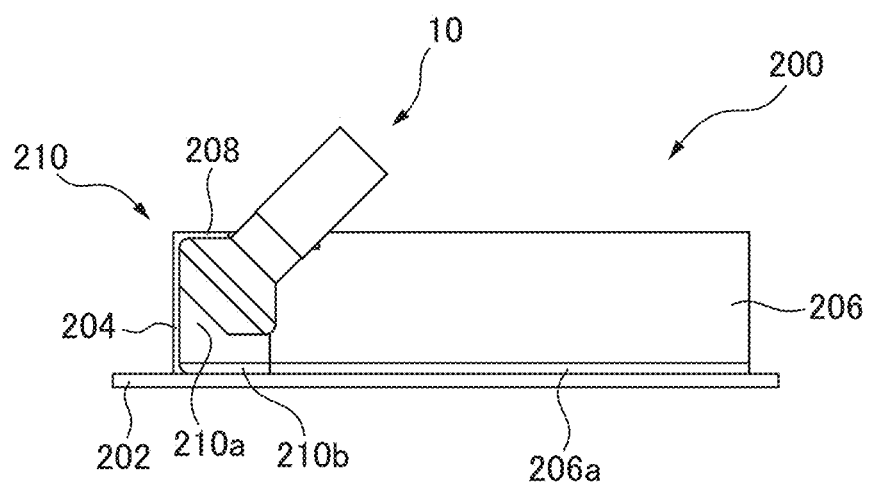
FIG. 20 is a side view as viewed in the direction of arrow XX of FIG. 18.
Figure 21:
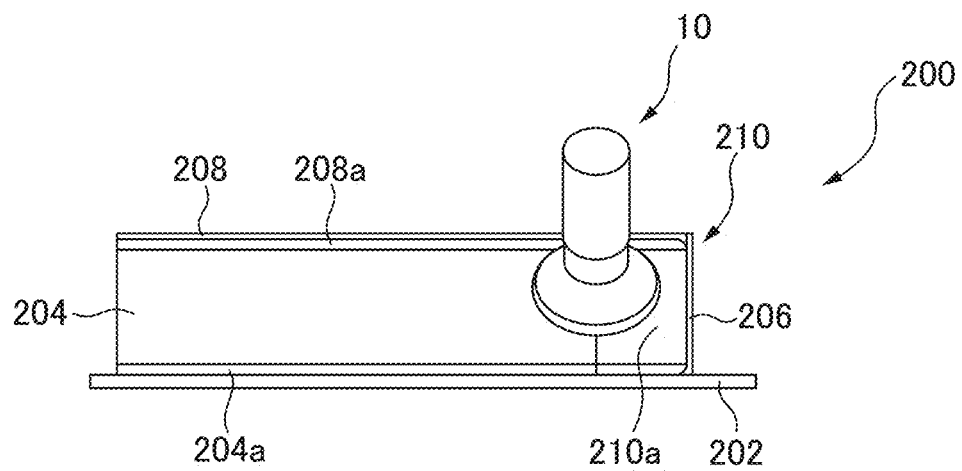
FIG. 21 is a side view as viewed in the direction of arrow XXI of FIG. 18.
Figure 22:
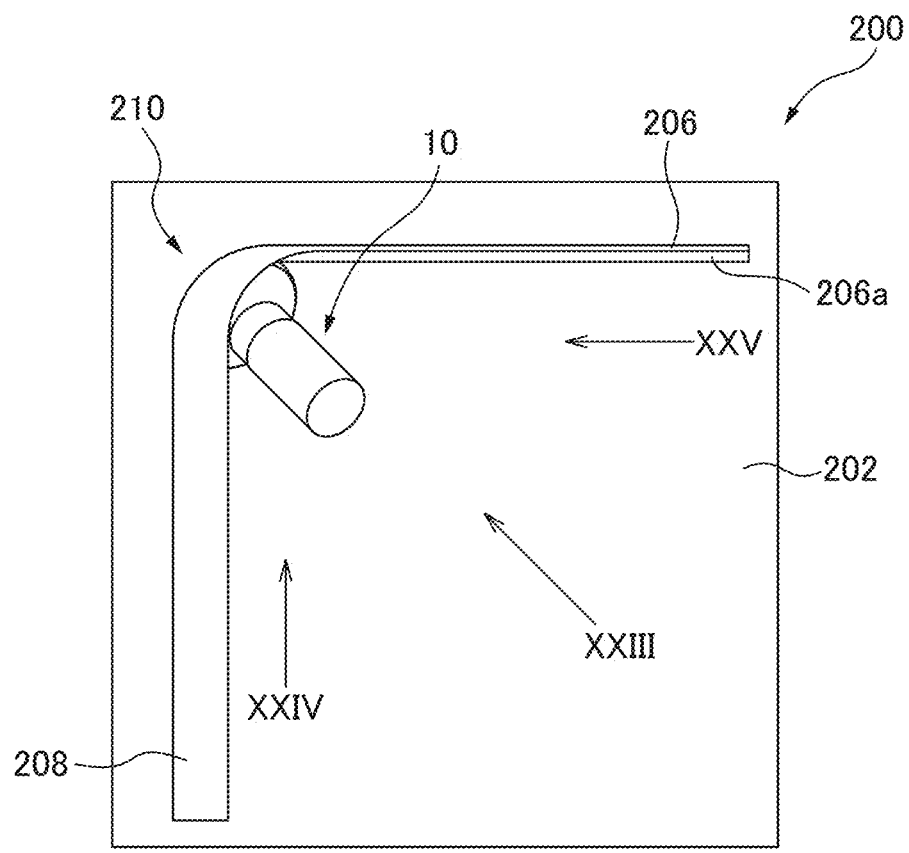
FIG. 22 is a schematic view detailing the machining of an undercut part at a corner part, and in FIG. 22, the milling tool machines approximately the central part of the corner part.
Figure 23:
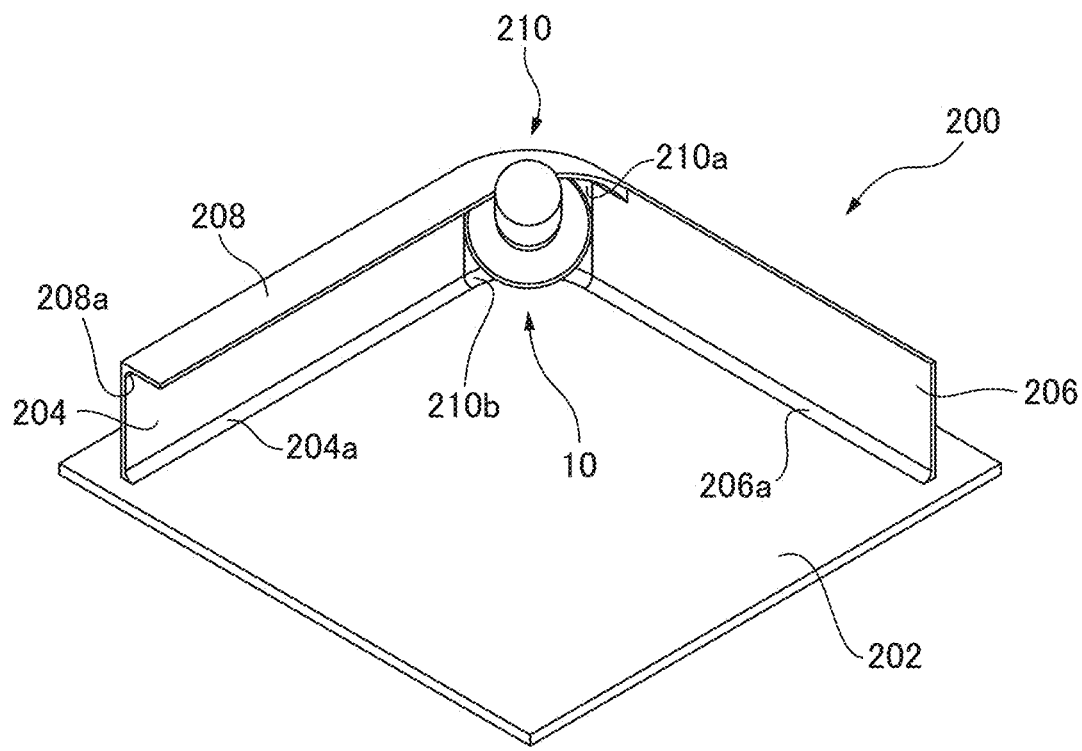
FIG. 23 is a perspective view as viewed in the direction of arrow XXIII of FIG. 22.
Figure 24:
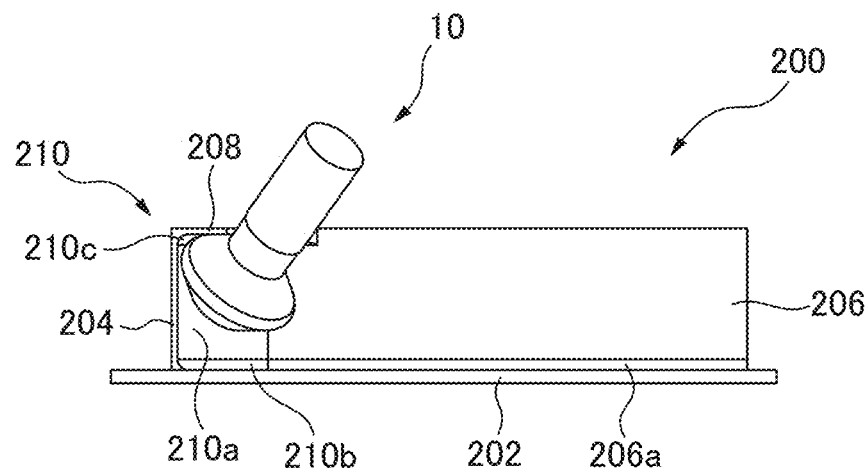
FIG. 24 is a side view as viewed in the direction of arrow XXIV of FIG. 22.
Figure 25:
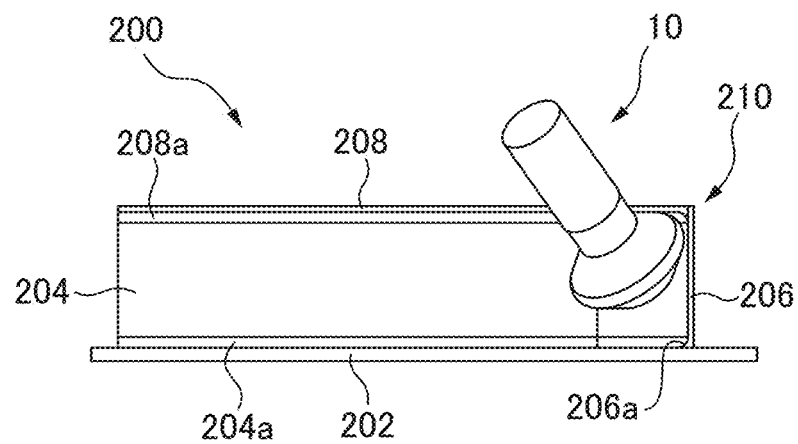
FIG. 25 is a side view as viewed in the direction of arrow XXV of FIG. 22.
Figure 26:
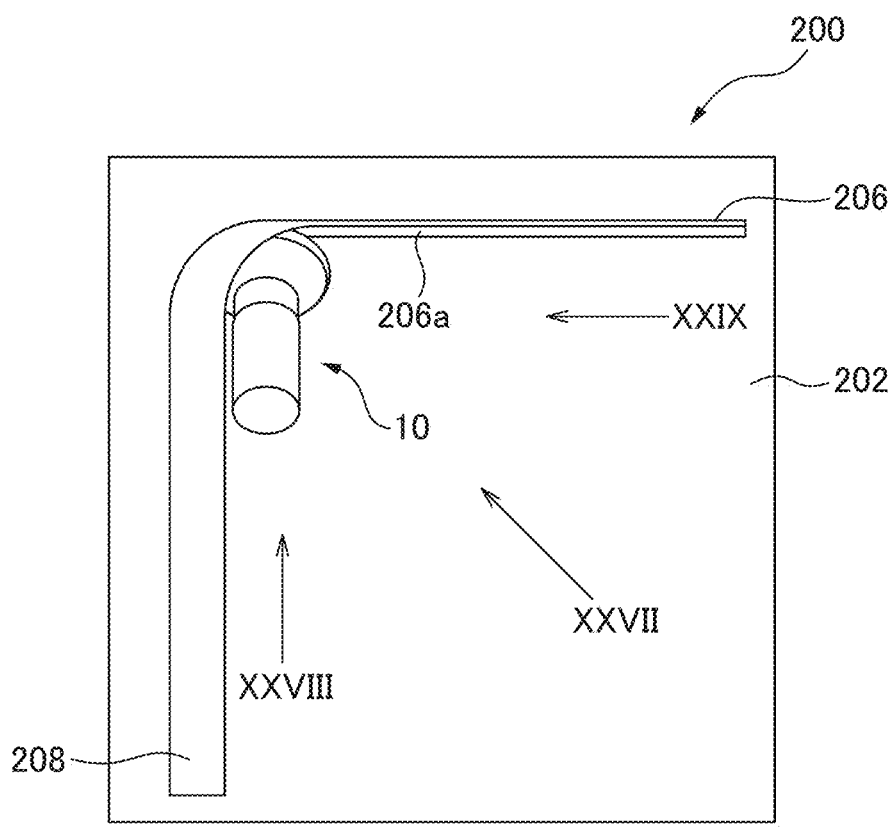
FIG. 26 is a schematic view detailing the machining of an undercut part at a corner part, and in FIG. 26, the milling tool reaches the outlet of the corner part.
Figure 27:
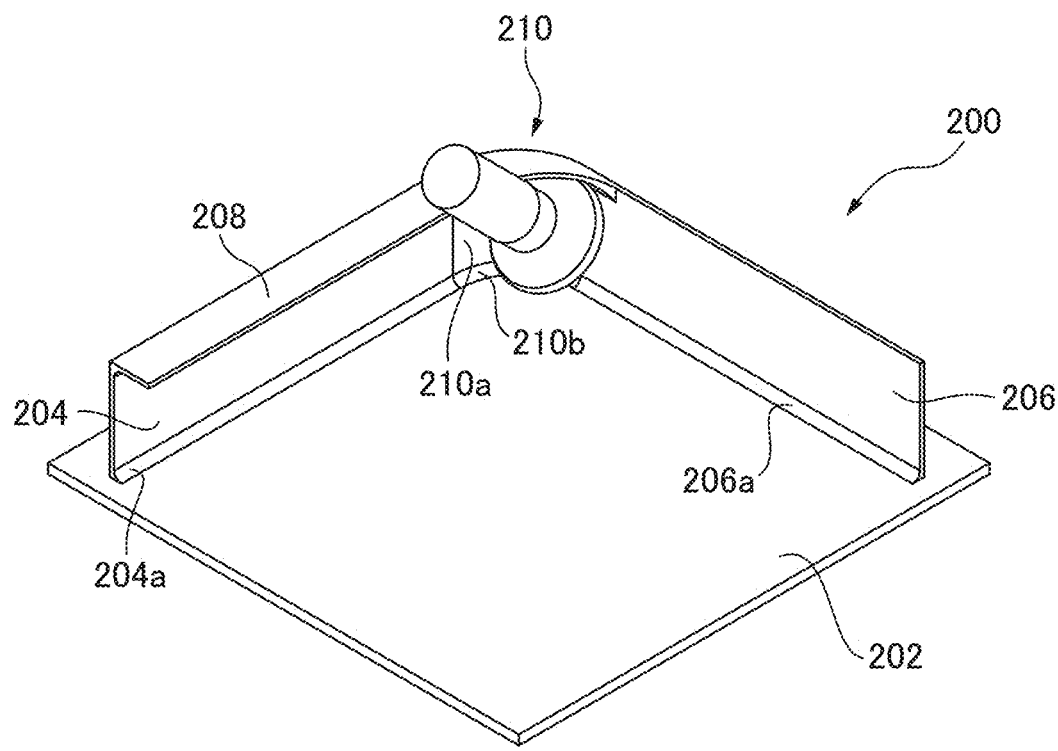
FIG. 27 is a perspective view as viewed in the direction of arrow XXVII of FIG. 26.
Figure 28:
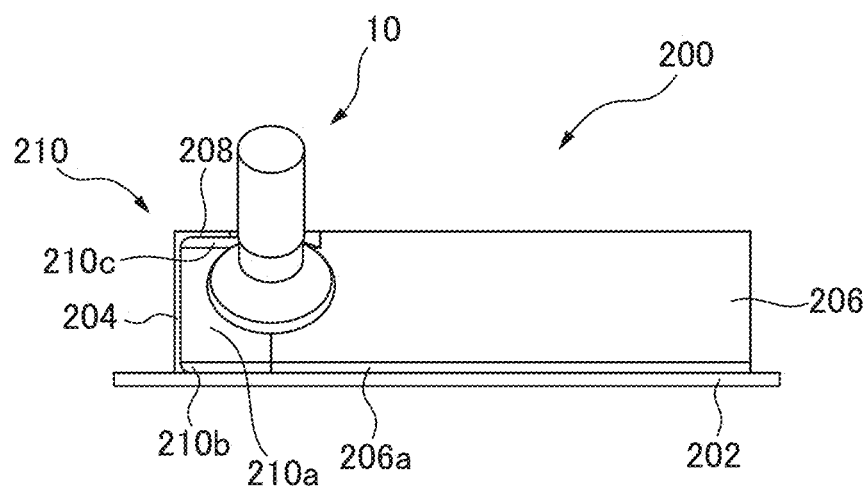
FIG. 28 is a side view as viewed in the direction of arrow XXVIII of FIG. 26.
Figure 29:
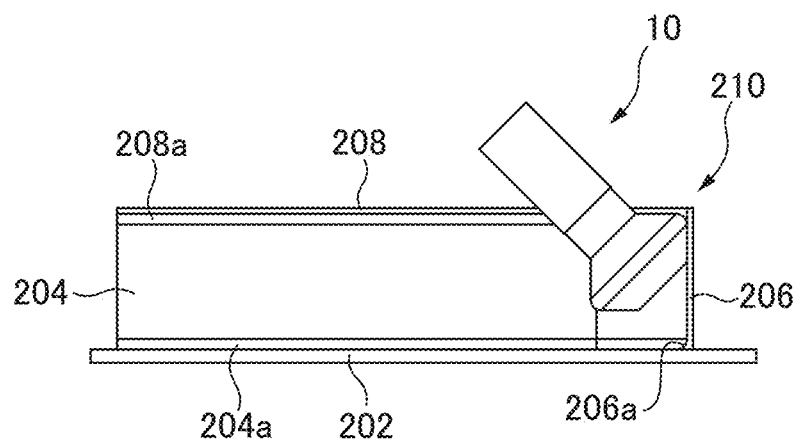
FIG. 29 is a side view as viewed in the direction of arrow XXIX of FIG. 26.
Figure 30:
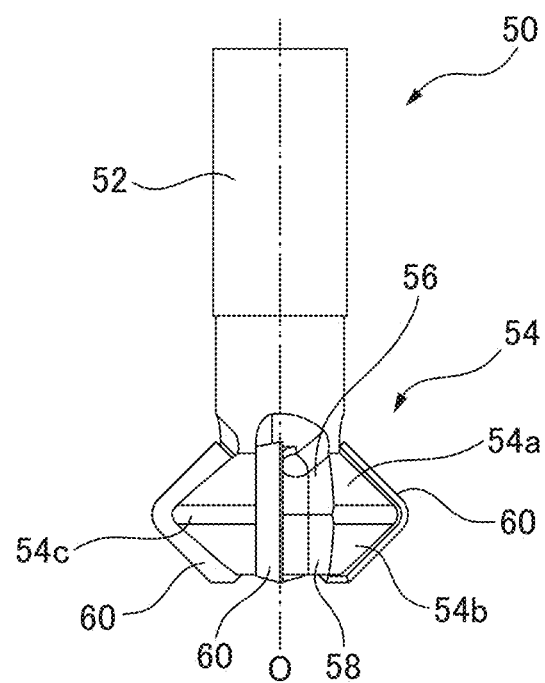
FIG. 30 is a front view of a milling tool according to a second example of the present invention.
Figure 31:
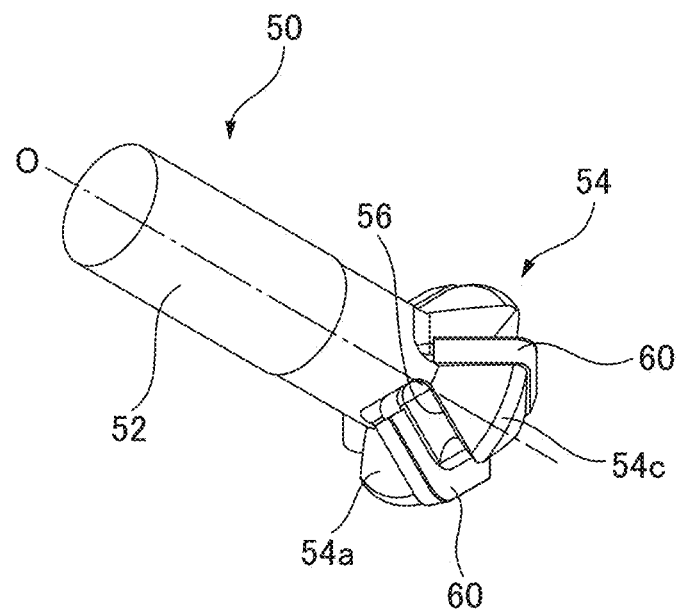
FIG. 31 is a perspective view of the milling tool of FIG. 30.

Portion 110a can be removed using the T-shaped cutter 72, as shown in FIG. 16. In this case, the T-shaped cutter 72 is oriented so that the axis of rotation thereof is parallel to the rib 104. Thus, the protruding length of the T-shaped cutter 72, i.e., the distance $L_{TC}$ from the bottom surface of the tool holder 74 to the tip of the T-shaped cutter 72, must be greater than the height of the rib 104. In contrast thereto, the milling tool 10 according to the present example is obliquely oriented so that the conical surface drawn by the lower inserts 22 comes into contact with the rib 104. Thus, the protruding length $L_{TP}$ of the milling tool 10 can be set to a length such that the return flange 106 or 108 do not interfere with the tool holder 74. Since the overhang lengths of the return flanges 106, 108 are normally much shorter than the height of the rib 104, the protrusion length $L_{TP}$ of the milling tool 10 can be shorter than the protrusion length $L_{TC}$ of the T-shaped cutter 72. By shortening the protrusion length, the tool normally has higher static rigidity against bending and inclination and higher dynamic rigidity against vibration, whereby the rotation speed of the tool and the feed rate of the tool can be increased. Thus, by using the milling tool 10 according to the present example, the product 100 can be more efficiently machined as compared to the case in which the T-shaped cutter 72 of the prior art is used. Furthermore, chatter is less likely to occur, whereby the quality of the machined surface is improved.

Further, the milling tool 10 can be used to machine not only a linear rib, as shown in FIGS. 13A to 15B, but also a rib which is bent by a predetermined angle, 90° in the illustrated example, as shown in FIGS. 18 to 29. In FIGS. 18 to 29, a workpiece 200 has a flat plate-like bottom wall 202, first and second ribs 204, 206 which protrude perpendicularly from the bottom wall 202, a return flange 208 which protrudes perpendicularly from the upper end of the first rib 204, and a corner part 210 at which the first and second ribs 204, 206 intersect. The first and second ribs 204, 206 connected to each other by the corner part 210 extend along the bottom wall 202 at an angle of 90°. Note that the workpiece 200 is affixed to a table (not illustrated) of a machine tool.

First, the milling tool 10 machines the upper edge of the first rib 204 and the lower surface of the return flange 208, as detailed in FIGS. 14A and 14B. In more detail, the milling tool 10 is linearly fed along the side surface of the upper edge of the first rib 204 from one end of the first rib 204 (the lower edge in FIG. 18) toward the corner part 201 (upwardly in FIG. 18) so that the lower surface of the return flange 208 and the side surface of the first rib 204 are simultaneously machined by the main cutting edge 20c of the upper insert 20 and the main cutting edge 22c of the lower insert 22, respectively. During machining (undercutting) of the side surface of the upper edge of the first rib 204 and the lower surface of the return flange 208, the corner R part 208a between the first rib 204 and the return flange 208 is simultaneously machined by the sub cutting edges 20d, 22d of the upper insert 20 and the lower insert 22.

As shown in FIGS. 18 to 21, when the milling tool 10 arrives at the inlet of the corner part 210, the milling tool 10 is continuously fed along a substantially arcuate tool path along the inner peripheral surface 210a of the upper edge of the corner part 210 without interruption (FIGS. 22 to 25). As described above, in the milling tool 10, since the lower insert 22 has the bottom cutting edge 22g and the inner cutting edge 22h, cutting can be performed while freely changing the cutting direction (the direction of the axis of rotation O of the milling tool 10) by simultaneous five-axis control, whereby machining marks such as steps on the machined surface are not formed, and a corner part 210 having a return flange as illustrated can be machined.

As shown in FIGS. 26 to 29, when the milling tool 10 arrives at the outlet of the corner part 210, the milling tool 10 is continuously linearly fed toward the front end of the second rib 206 (rightward in FIGS. 22 and 24) along the side surface of the second rib 206 without interruption. During this movement, the side surface of the upper edge of the second rib 206 is machined by the main cutting edge 22c of the lower insert 22. When the milling tool 10 arrives at the front end of the second rib 206 (the right part in FIGS. 22 and 24) and machining of the upper edge of the second rib 206 is complete, a pick feed is imparted to the milling tool 10 in the direction (downward) approaching the bottom wall 202. Next, the milling tool 10 is linearly fed along the side surface of the second rob 206 toward the corner part 210, and the lower side of the machined surface completed in the previous machine process is machined on the side surface of the second rib 206.

Note that though straight lines are shown between the first rib 204 and the corner part 204 and between the corner part 210 and the second rib 206 in FIGS. 18 to 29, these straight lines are merely shown in the drawings for the purpose of making the first rib 204, the corner part 210, and the second rib 206 easy to understand. Machining marks such as linear steps and grooves are not actually formed on the machined surface.

When the side surface of the upper edge of the first rib 204 is machined along with the lower surface of the return flange 208, the corner part 210 and the side surface of the upper edge of the second rib 206 are machined, and the first rib 204, the corner part 210, and the side surface of the second rib 206 are machined in this manner, finally, an uncut portion (not illustrated) similar to the portion 110a having a triangular cross section shown in FIG. 14B is formed between the first rib 204, the corner part 210 and the second rib 206, and the bottom wall 202. This uncut portion can be removed by the T-shaped cutter, as shown in FIG. 15A. At this time, the corner R parts 204a, 210b, 206a between the first rib 204, the corner part 210 and the second rib 206, and the bottom wall 202 can be formed in accordance with the shape of the T-shaped cutter.

Note that in the example shown in FIGS. 18 to 29, the return flange 208 extends substantially parallel to the bottom wall 202 along the upper end of the first rib 204 and has a constant width. The width of the return flange 208 at the corner part 210 gradually reduces towards the second rib 206, and the return flange is substantially not provided on the second rib 206. However, the workpiece 200 may have a return flange similar to the return flange 208 along the upper end of the second rib 206.

Next, a second example of the milling tool of the present invention will be described with reference to FIGS. 30 to 40.

Though the inserts were divided into upper inserts 20 and lower inserts 22 in the first example, in the second example, both inserts 20, 22 are integral so as to form a single V-shaped insert, and this insert is attached from the expanding diameter section of the head to the decreasing diameter section.

A milling tool 50 comprises a cylindrical shank 52 and a head 54 which is integrally formed with the tip of the shank 52. The head 54 has an approximately frustoconical expanding diameter section 54a, the diameter of which increases from the proximal end which contacts the shank 52 in the direction toward the proximal end, and an approximately frustoconical decreasing diameter section 54b, the diameter of which decreases along the direction from the expanding diameter section 54a toward the distal end, and the head 54 has substantially a double conical shape. A transition part 54c as a maximum diameter part, at which the diameter is maximum, is formed between the expanding diameter section 54a and the decreasing diameter section 54b. In the present example, the transition part 54c presents a shape of a rotating body obtained by rotating an arc which bulges in the radial direction of the head 54 about the central axis O of the milling tool 50.

The head 54 has upper grooves 56 formed in the expanding dimeter section 54a and lower grooves 58 formed in the decreasing diameter section 54b. Four pairs of upper grooves 56 and lower grooves 58 arranged at equal angular intervals around the central axis O of the head 54 are formed in the head 54. Each pair of upper grooves 56 and lower grooves 58 are continuous and form one groove portion formed over the expanding diameter section 54a, the transition part 54c, and the decreasing diameter section 54b. Though the number of the grooves is not an indispensable requirement of the present invention, at least one groove can be provided.

A seat 62 for attachment of the insert 60 is formed in each groove 56, 58. The seat 62 is defined by a flat surface for receiving the insert 60 formed in a V-shape. In the present example, the flat surface forming the seta 62 is parallel to the central axis O of the milling tool 50.

Further, a coolant passage for providing coolant to the machining area can be formed in the milling tool 50. The cooling passage can include an inlet passage 64 which passes through the shank 52 along the central axis O of the milling tool 50, upper radial passages 66a which pass through the head 54 from the inlet passage 64 in the radial directions and which open into a side wall 56a which faces the seat 62 of each upper groove 56, and lower radial passages 66b which open into a side wall 58a which faces the seat 62 of each lower groove 58.

Figure 38:
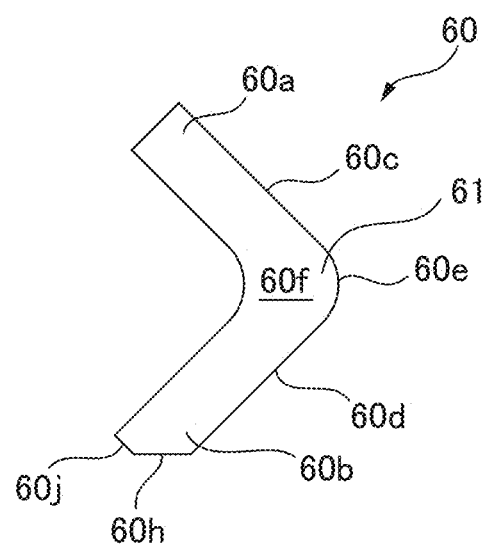
FIG. 38 is a front view of an insert used in the milling tool of FIG. 30.
Figure 39:
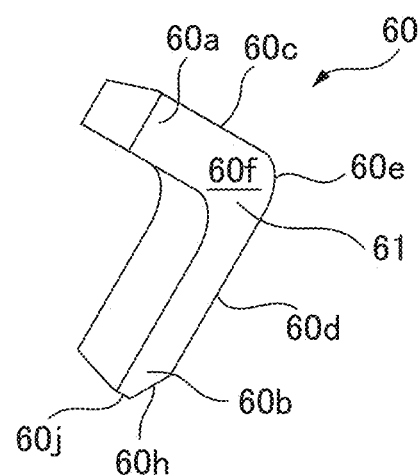
FIG. 39 is a perspective view of the insert of FIG. 30.
Figure 40:
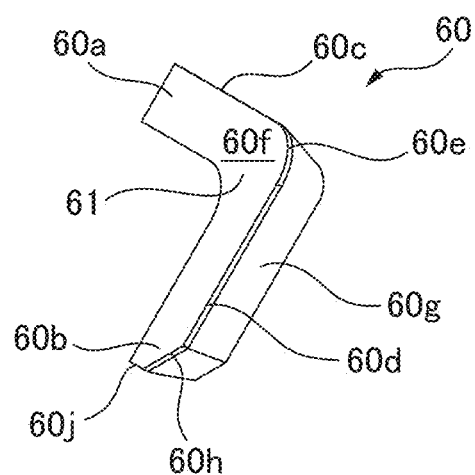
FIG. 40 is a perspective view of the insert of FIG. 30 as viewed from a different direction.

Referring to FIGS. 38 to 40, the insert 60 has first and second arms 60a, 60b and a bent part 61 for connecting the first and second arms 60a, 60b, and the insert 60 is substantially V-shaped. The insert 60, when attached to the seat 62, has a rake face 60f is arranged on the side opposite the seat 62 and which faces the side wall 56a of the upper groove 56 which and a flank face 60g which is oriented toward the radially outer side. A first main cutting edge 60c which extends substantially linearly on the arm 60a, a second main cutting edge 60d which extends substantially linearly on the second arm 60b, and an arc-shaped sub cutting edge 60e which is provided on bent part 61 and which is connected to the first and second main cutting edges 60c, 60d are formed by the rake face 60f and the flank face 60g.

The insert 60 is attached to the seat 62 so that the first main cutting edges 60c rotate along the same conical surface and the second main cutting edges 60d rotate along the same conical surface when the milling tool 50 rotates about the central axis O. When the milling tool 50 rotates, the two lines of intersection (the generatrix of each conical surface) between the conical surfaces drawn by the first and second main cutting edges 60c, 60d and the plane including the central axis O intersect at a predetermined angle. This angle can be set to various values depending on the target machining process. The angle formed by the two lines of intersection described above can be equal to, for example, the angle between the rib, which is described later, and the return flange protruding from the upper end of the rib, and can be preferably 90°.

Figure 32:
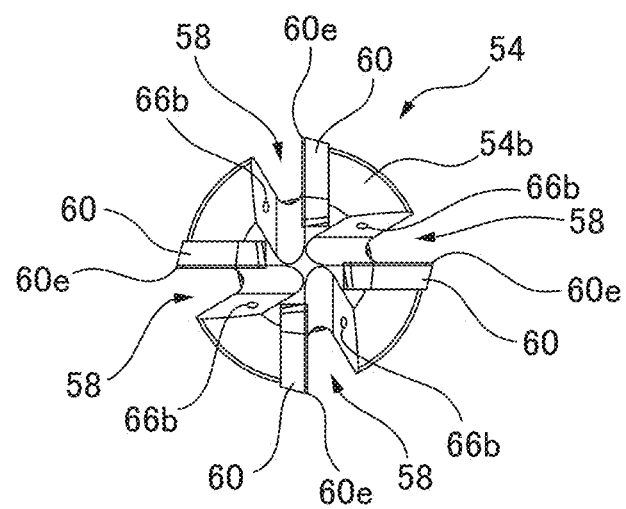
FIG. 32 is a bottom view of the milling tool of FIG. 30 as viewed from the head side.
Figure 33:
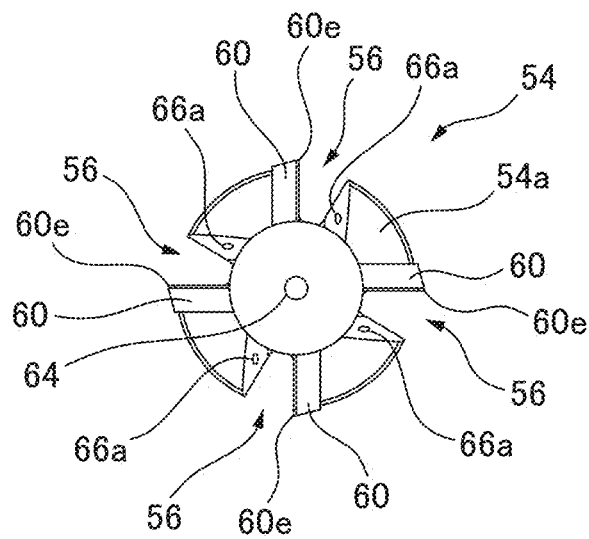
FIG. 33 is a plan view of the milling tool of FIG. 30 as viewed from the shank side.
Figure 34:
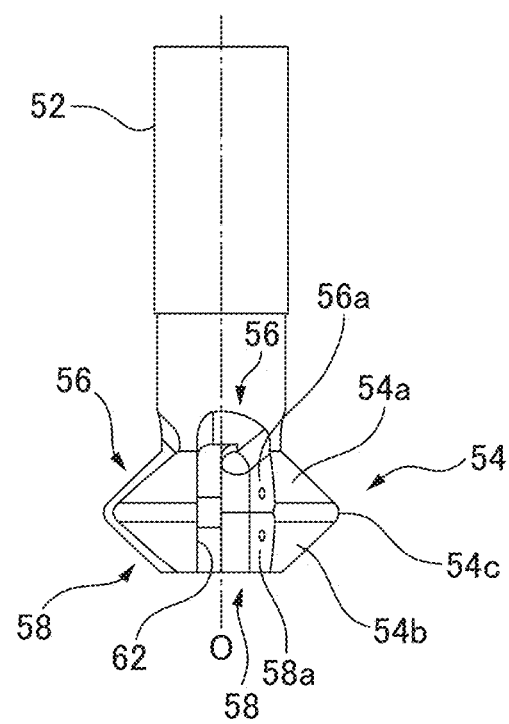
FIG. 34 is a front view of the milling tool of FIG. 30 in which the cutting edge is removed.
Figure 35:
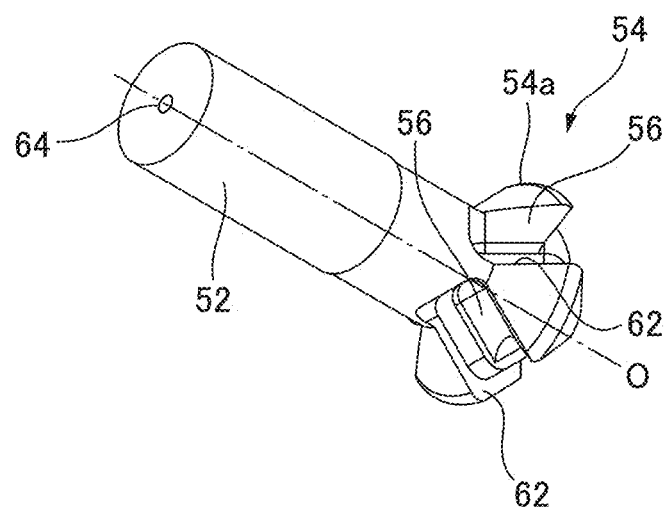
FIG. 35 is a perspective view of the milling tool of FIG. 30 in which the cutting edge is removed.
Figure 36:
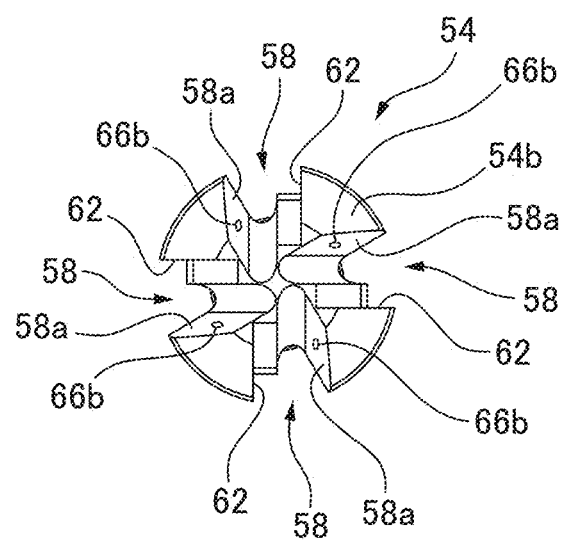
FIG. 36 is a bottom view of the milling tool of FIG. 30 as viewed from the head side, in which the cutting edge is removed.
Figure 37:
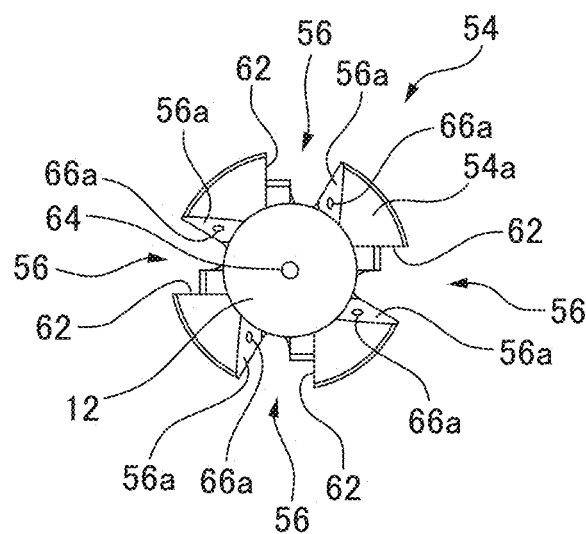
FIG. 37 is a plan view of the milling tool of FIG. 30 as viewed form the shank side, in which the cutting edge is removed.

Furthermore, when the insert 60 is attached to the seat 62, as shown in FIGS. 32 and 33, the first and second main cutting edges 60c, 60d, the sub cutting edge 60e, the bottom cutting edge 60h, and the inner cutting edge 60j are preferably arranged in a single plane including the central axis O of the milling tool 50. Further, the first and second main cutting edges 60c, 60d, the sub cutting edge 60e, the bottom cutting edge 60h, and the inner cutting edge 60j are arranged in the same plane in which the first and second main cutting edges 60c, 60d, the sub cutting edge 60e, the bottom cutting edge 60h, and the inner cutting edge 60j of the insert 60 on the diametrically opposite side.

Further, the insert 60 is attached to the seat 62 so that, when the milling tool 50 rotates about the central axis O, the sub cutting edge 60e draws a locus of one rotary body shape obtained by rotating the circular arc that bulges in the radial direction of the head 14 about the central axis O of the milling tool 50. The shape of the rotating body may be a shape which is inscribed in both of the two conical surfaces drawn by the first and second main cutting edges 60c, 60d of the insert 60 when the milling tool 50 rotates.

Furthermore, the insert 60 can be attached to the seat 62 using an appropriate bonding technology such as brazing. Further, after the insert 60 has been attached to the seat 62, the insert 60 may be ground so that the generatrix of each of the two conical surfaces drawn by the first and second main cutting edges 60c, 60d achieves an angle matching the angle between the rib and the return flange protruding from the upper end of the rib and the shape of the rotating body drawn by the sub cutting edge 60e is inscribed on both of the two conical surfaces.

REFERENCE SIGNS LIST

10 Milling Tool
12 Shank
14 Head
14a Expanding Diameter Section
14b Decreasing Diameter Section
20 Upper Insert
22 Lower Insert
104 Rib
106 First Return Flange
108 Second Return Flange
204 First Rib
206 Second Rib
208 Return Flange
210 Corner Part

The invention claimed is:

1. A workpiece machining method for undercutting interior portions of a rib of a workpiece attached to a table of a five-axis machine tool, having at least two rotary feed axes, and a return flange formed contiguous with the rib, the method comprising the steps of:
- attaching a milling tool to a spindle of the five-axis machine tool and rotating the milling tool, wherein the milling tool is composed of a shank part and a double truncated conical shaped head which is provided on a distal end of the shank part, wherein the double truncated conical shaped head has an expanding diameter section, the diameter of which gradually increases along a direction from a proximal end contiguous with the shank part toward a distal end, and a decreasing diameter section, the diameter of which gradually decreases along a direction from a maximum diameter section toward the distal end, wherein each of the expanding diameter section and the decreasing diameter section has cutting inserts with a respective linear main cutting edge, and wherein each cutting insert is attached to a cutting insert seat;
- obliquely orienting a rotation axis of the spindle relative to each of the rib and the return flange, wherein the rib extends perpendicular to a bottom surface of the workpiece and the return flange extends substantially parallel to the bottom surface;
- machining an undercut on an interior of the return flange with the linear main cutting edges of the expanding diameter section of the double truncated conical shaped head of the milling tool and machining a side surface of the rib with the linear main cutting edges of the decreasing diameter section of the milling tool resulting with a triangular columnar portion remaining between the rib and the bottom surface of the workpiece;
- exchanging the milling tool attached to the spindle with a T-shaped cutter; orienting the rotation axis of spindle parallel to the rib and perpendicular to the bottom surface; and
- removing the triangular columnar portion with the T-shaped cutter,
- wherein a length of the milling tool protruding from the spindle, when the milling tool is attached to the spindle, is shorter than a length of the T-shaped cutter protruding from the spindle when the T-shaped cutter is attached to the spindle, wherein each length is measured in a direction parallel to the rotation axis of the spindle.

2. The workpiece machining method of claim 1, wherein a posture and a position of the milling tool are controlled relative to the workpiece to perform undercutting of a corner portion at which the rib and the return flange intersect.

3. The workpiece machining method of claim 1, wherein the rib and the return flange define an angle therebetween,
- the linear main cutting edges of the expanding diameter section and the linear main cutting edges of the decreasing diameter section define therebetween an angle the same as the angle between the rib and the return flange, and
- machining the workpiece by feeding the milling cutter in a direction parallel to the rib and perpendicular the bottom surface whereby material is removed from the return flange to the bottom surface.

* * * * *